United States Patent Office 3,705,944
Patented Dec. 12, 1972

3,705,944
INSECTICIDAL AND ACARICIDAL COMPOSITIONS AND METHODS USING 2-PHENYL-BENZIMIDAZOLES
Wilhelm E. Frick, Pfeffingen, Basel-Land, Horst Harle, Allschwil, Thomas Wenger, Riehen, and Anton Weiss, Basel, Switzerland, assignors to Geigy Chemical Corporation, Ardsley, N.Y.
No Drawing. Original application Apr. 27, 1967, Ser. No. 634,092, now Patent No. 3,624,100. Divided and this application Mar. 18, 1971, Ser. No. 125,830
Claims priority, application Switzerland, May 6, 1966, 6,667/66
Int. Cl. A01n 9/22
U.S. Cl. 424—273                                9 Claims

ABSTRACT OF THE DISCLOSURE

New 2-phenyl-benzimidazoles which are substituted by at least three halogen and/or trifluoromethyl radicals none of which, however, is present at the phenyl radical in an ortho-position relative to the link to the benzimidazole moiety, and optionally by further substituents; as well as their alkali metal and alkaline earth metal salts; which compounds are useful as insecticides and acaricides; and insecticidal and acaricidal compositions containing such compounds as active ingredients; a method of controlling insects and acarinae, and of protecting keratinous material from damage by insects or their larvae, with the aid of such novel compounds; as well as keratinous materials protected with the aid of the said compounds.

CROSS-REFERENCE TO RELATED APPLICATIONS

This application is a division of Ser. No. 634,092, filed on Apr. 27, 1967, now U.S. Pat. No. 3,624,100.

BACKGROUND OF THE INVENTION

(1) Field of the invention

The present invention concerns new substituted benzimidazole derivatives having insecticidal properties as well as insecticidal and acaricidal agents which contain these new benzimidazole derivatives as active substances and, in particular, serve to combat keratin-eating insects and their larvae, as well as the use of these active substances and the agents containing them for combatting insects and spiders, in particular however, for the protection of keratinous materials from attack by such insects.

(2) Description of the prior art

Of the benzimidazole derivatives known today, those containing a low molecular halogenoalkyl radical in the 2-position have been suggested as herbicidal and pesticidal active substances for combatting weeds, insects, nematodes and mites (Dutch application open to public inspection 64/10,413; Angew. Chem. 77 (1965), pages 814 and 911–912). These literature citations make no mention of a keratin-protecting action of these substances. These 2-halogen-alkyl-benzimidazoles, if they are polyhalogenated in the nucleus, have marked toxicity to warm-blooded animals which limits their possibilities of application.

DESCRIPTION OF THE INVENTION

It has now been found that new substituted 2-phenyl-benzimidazoles of the formula

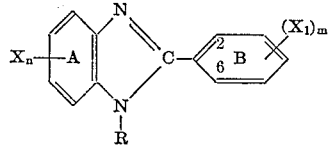

(I)

wherein

R represents hydrogen or a metal cation,
each of the symbols X and $X_1$ represents a halogen atom having an atomic number of at most 35, a trifluoromethyl group, an alkyl or alkoxy radical, the nitro, hydroxyl or amino group, an alkanoylamino group, a substituted or unsubstituted phenoxy or phenylsulphonyl group or the radical of sulphonic acid and its amide and ester forms,
n represents a whole number from 1 to 4, and
m represents a whole number from 1 to 5, with the condition that, in all, at least three of the substituents symbolised by X and $X_1$ are halogen atoms and/or trifluoromethyl radicals of which, however, none is in 2- or 6-position at the phenyl radical B, and that there are, at most, two trifluoromethyl groups in each of the two benzene nuclei of the molecule, have excellent insecticidal and acaricidal properties, in particular, a marked action against keratinous material-devouring insects and their stages of development, e.g. the larvae of moths and other small butterflies, also fur and carpet beetle larvae. For this reason the new active substances of Formula I are particularly suitable for the protection of keratinous material such as wool and articles containing wool, from attack by such pests.

The strength of action of the new benzimidazole derivatives of Formula I depends substantially on the nature of their substitution, by halogen atoms and/or trifluoromethyl groups; at least three such substituents must be present in the molecule in order to attain a satisfactory insecticidal action. Compared with known halogenated and/or trifluoromethylated 2-trifluoromethylbenzimidazoles which have been suggested as pesticidally active substances (Angew. Chem. 77 (1965) pages 814 and 911–912), the new compounds, whilst having about the same number of halogen substituents in the condensed benzene ring A, have much less toxicity to warm blooded animals. For example, the $DL_{50}$ of the known 4,5,6,7-tetrachloro-2-trifluoromethyl-benzimidazole to rats per os is less than 10 mg./kg. whereas the $DL_{50}$ of the 4,5,6,7-tetrachloro-2-(3',4'-dichlorophenyl)-benzimidazole according to the invention is higher than 5000 mg./kg.

Compounds of Formula I, wherein R is hydrogen, are acids which are capable of forming salts e.g. with alkali metal hydroxides and alkaline earth metal hydroxides and the corresponding carbonates, in which salts R is the monovalent equivalent of a metal cation. Preferred salts are the soluble alkali metal salts, particularly the sodium and potassium salts.

All substituents X and $X_1$ can be the same or different but at least three of them must be halogen atoms of an atomic number of at most 35 and/or trifluoromethyl. The preferred halogen substituents are chlorine and bromine. Halogen substituents can be replaced by trifluoromethyl groups, but in practice it is not possible to build in more than two trifluoromethyl groups in each of the two benzene nuclei A and B of the molecule defined by Formula I. In the phenyl radical B, no halogen atom or $CF_3$ group may be in orthoposition to the linking position to the bezimidazole structure as otherwise effective insecticidal activity is lost. The other radicals represented by $X_1$ may also be in 2- and/or 6-position at ring B. The benzene nuclei A and B have preferably not more than one of the other substituents, of which the alkyl, alkoxy and alkanoylamino radicals falling under the definition of X and $X_1$ have from 1 to 5 carbon atoms in their alkyl moiety; the methyl, methoxy and acetylamino radicals being preferred. Suitable substituted phenoxy and phenylsulphonyl radicals are those which are substituted by at least one halogen atom and/or one $CF_3$ group.

The new active substances have excellent affinity to keratinous fibres. Due to their affinity to such fibres, the 2-phenyl-benzimidazole derivatives of Formula I draw from aqueous dispersions, and also from aqueous solutions of their salts, onto these fibres and in this way protect keratinous material treated therewith from injury caused by larvae from moths and other small butterflies as well as from injury caused by the larvae of the fur and carpet beetles (Anthrenus and Attagenus).

The compounds of Formula I are also active, however, against other insects, including termites, and also mites, etc., and can thus be used generally in plant protection, particularly for industrial application in plant protection and protection of materials, e.g. for the protection of organic materials such as paper, wood, textiles, plastics, etc. from attack by insects and mites.

The new benzimidazole derivatives of Formula I can be produced by the following methods:

(a) o-Phenylenediamines, optionally substituted by radicals X of the formula

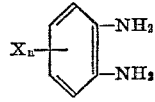

are condensed e.g. in the melt, optionally in the presence of catalysts such as mineral acids, polyphosphoric acid or meta-phosphoric acid esters, with optionally substituted benzoic acids or with their esters, amides, acid halides and nitriles, and optionally, subsequently chlorinated or brominated in at least one benzene nucleus, preferably in dimethyl formamide as solvent.

The new 2-phenyl-benzimidazoles are also obtained by a variation of this process when the o-phenylenediamines mentioned above are reacted with the corresponding benzaldehydes in the presence of an oxidising agent such as copper acetate or nitrobenzene instead of with benzoic acid derivatives.

(b) The new 2-phenyl-benzimidazoles can also be obtained by reductive cyclisation, e.g. with zinc and hydrochloric acid, of correspondingly substituted N-benzoyl-o-nitranilines. This cyclisation can also be performed in steps. This method is of particular interest if the usual cyclisation methods are made difficult due to the presence of a sterically hindered specific substituent X. Starting from o-chloronitrobenzenes, first o-nitranilines are produced and then acylated in the amino group with a reactive benzoic acid derivative and in this way the N-benzoyl-o-nitranilines are obtained as starting materials for the reductive cyclisation. The cyclised 2-phenyl-benzimidazoles can then be halogenated in the benzene nuclei.

(c) Finally, the new active substances of General Formula I can also be obtained by oxidative cyclisation of optionally substituted N-phenyl-benzamidines of the formula

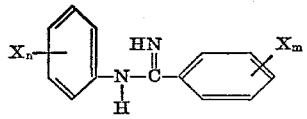

Preferably a hypochlorite is used as oxidising agent. In this method it is better to use unhalogenated or only slightly halogenated benzamidines as starting materials and, after cyclisation, to halogenate the products obtained.

The latter method of oxidative cyclisation of N-phenyl-benzamidines is of particular interest if the nitranilines and 1,2-phenylenediamines necessary for the production methods described above are difficulty accessible.

Elementary chlorine and bromine in particular are used for the halogenation of the 2-phenyl-benzimidazoles in order to introduce halogen or to increase the halogen substitution.

Water, aromatic hydrocarbons, halogenated hydrocarbons, N-alkylated acid amides and alcohols, e.g. methanol or glycol monomethyl ether can be used as solvents or diluents for the halogenation. The halogenation is performed in aqueous medium with elementary chlorine or with nascent chlorine from hydrogen chloride in the presence of oxidising agents, or with elementary bromine and bromate in the presence of dilute acid. Sulphuryl chloride is the principle example of an agent which gives off nascent chlorine.

Halogenation of the benzimidazoles with elementary chlorine or bromine in an N-alkylated organic acid amide, particularly dimethyl formamide, optionally in the presence of a catalyst, at temperatures between 0 and 100° C., is preferred.

The following examples described the production of the new active substances of General Formula I. Where not otherwise stated, parts and percentages are given by weight and the temperatures are given in degrees centigrade.

EXAMPLE 1

2-(3',5'-bis-trifluoromethyl-phenyl)-4,5,6,7-tetrachloro-benzimidazole (a) 16.2 parts of 1,2-phenylenediamine are dissolved in 100 parts of metaphosphoric acid triethyl ester while stirring and heating to 100°. 26 parts of 3,5-bis-trifluoromethyl benzoic acid are then added and the mixture is heated for 1 hour at 120°. After cooling to 50°, 1500 parts of water are added and the suspension so formed is made weakly alkaline (pH=8) by the addition of solid sodium bicarbonate. The product is filtered, washed, dried and dissolved in ethanol. The side product, the diamide of o-phenylenediamine, which in practice is insoluble in ethanol, is removed and the 2-(3',5'-bis-trifluoromethyl-phenyl)-benzimidazole is crystallised from aqueous alcohol: M.P. 218–219°.

(b) 18 parts of chlorine are introduced over a period of 2 hours into a 60° hot solution of 6.6 parts of 2-(3',5'-bis-trifluoromethyl-phenyl)-benzimidazole and 0.1 part of iron-III chloride in 100 parts by volume of dimethyl formamide. The reaction mixture is then added to 2000 parts by volume of water while stirring vigorously. The precipitate formed is filtered off, washed with water and then dried. The 2-(3',5'-bis-trifluoromethyl-phenyl)-4,5,6,7-tetrachloro-benzimidazole melts at 278.5–279°.

EXAMPLE 2

2-(3',4'-dichlorophenyl)-4,7-dibromo-5,6-dichloro-benzimidazole (a) A finely pulverised mixture of 18.7 parts of 4,5-dichloro-ortho-phenylenediamine and 19.1 parts of 3,4-dichloro-benzoic acid is heated for 1 hour at 120–130° with 120 parts of meta-phosphoric acid ethyl ester, while stirring. 2000 parts of water are added to the cold reaction product and the suspension so obtained is made alkaline with solid sodium bicarbonate. The product is filtered off, dried and recrystallised from ethanol.

The 2 - (3',4'-dichlorophenyl)-5,6-dichloro-benzimidazole obtained melts at 251–252°.

(b) 10 parts of 2-(3',4'-dichlorophenyl)-5,6-dichloro-benzimidazole are suspended in 200 parts of water and 3 parts of concentrated sulphuric acid are added. The whole is brought to the boil and simultaneously 8 parts of bromine and also a solution of 4.2 parts of potassium bromate in 60 parts of water are added dropwise within about 1 hour. The whole is then refluxed for 10 hours, again the amounts of bromine and bromate solution given above are added dropwise and the whole is refluxed for another 10 hours. Excess bromine is then distilled off and the reaction product, when cold, is filtered off under suction. The crude product is dissolved in a mixture of 2 N sodium hydroxide solution and ethanol, the filtrate is acidified with dilute hydrochloric acid and the precipitate is filtered off, dried and recrystallised from ethanol. The 2-(3',4'-dichlorophenyl) - 4,7 - dibromo-5,6-dichloro-benzimidazole melts at 269–270°.

EXAMPLE 3

2-(3',4',5'-trichlorophenyl)-4,6-bis-trifluoromethyl-benzimidazole (a) A mixture of 6.9 parts of 3,5-bis-trifluoromethyl aniline, 6.2 parts of 3,4,5-trichlorobenzonitrile and 4.2 parts of anhydrous zinc chloride is heated for 3 hours at 180°. The cold melt is dissolved with warm alcohol, water and chloroform are added, the chloroform phase is removed, dried with $MgSO_4$, the chloroform is evaporated in vacuo and the residue is recrystallised from hexane.

The N-(3,5 - bis - trifluoromethyl - phenyl)-3',4',5'-trichlorobenzamidine so obtained crystallises into needles which melt at 148–151°.

(b) 17.4 parts of this benzamidine are dissolved in 150 parts by volume of methanol and 80 parts by volume of 1 N HCl are added. 28 parts by volume of 1.5 molar NaOCl solution are then added dropwise at room temperature and the whole is stirred for 10 minutes. The reaction milieu is made alkaline by the addition of 7.5 parts of sodium carbonate and then the whole is refluxed for 30 minutes. After evaporation of the methanol, the reaction product is isolated and recrystallised from methanol. The 2-(3',4',5'-trichlorophenyl)-4,6 - bis - trifluoromethyl-benzimidazole is obtained in this way as silky needles which melt at 188–190°.

EXAMPLE 4

2-(3',4'-dichlorophenyl)-4,5,6,7-tetrachloro-benzimidazole

A mixture of 12.3 parts of tetrachloro-o-phenylenediamine, 10.5 parts of 3,4-dichlorobenzoyl chloride and 50 parts by volume of 25% hydrochloric acid is heated in a bomb tube for 40 minutes at 180–185°. After cooling, dilute sodium hydroxide solution and alcohol are added to the reaction mixture and the alkaline solution of the reaction product is treated with animal charcoal and filtered. Dilute hydrochloric acid is added to the filtrate and the precipitate formed is filtered off under suction and washed with water. After recrystallisation from alcohol, the end product melts at 277–278°.

The following benzimidazole derivatives of General Formula I are produced in a manner analogous to those described in the above examples:

TABLE I

| Ex. No. | Compound | M.P. (deg.) |
|---|---|---|
| 5 | 2-(3'-chlorophenyl)-4,5,6,7-tetrachloro-benzimidazole | 322–324 |
| 6 | 2-(4'-chlorophenyl)-4,5,6,7-tetrachloro-benzimidazole | 265–270 |
| 7 | 2-(3'-bromophenyl)-4,5,6,7-tetrachloro-benzimidazole | 327–330 |
| 8 | 2-(3'-chlorophenyl)-4,5,6,7-tetrabromo-benzimidazole | 320–322 |
| 9 | 2-(4'-chlorophenyl)-4,5,6,7-tetrabromo-benzimidazole | 277–279 |
| 10 | 2-(3'-bromophenyl)-4,5,6,7-tetrabromo-benzimidazole | 325–328 |
| 11 | 2-(4'-bromophenyl)-4,5,6,7-tetrabromo-benzimidazole | 253–256 |
| 12 | 2-(3'-trifluoromethyl-phenyl)-4,5,6,7-tetrachloro-benzimidazole | 321–323 |
| 13 | 2-(4'-trifluoromethyl-phenyl)-4,5,6,7-tetrachloro-benzimidazole | 274–276 |
| 14 | 2-(4'-nitrophenyl)-4,5,6,7-tetrachloro-benzimidazole | 317–319 |
| 15 | 2-[4'-(p-chlorophenoxy)-phenyl]-4,5,6,7-tetrachloro-benzimidazole | 246–248 |
| 16 | 2-(3',5'-dinitrophenyl)-4,5,6,7-tetrachloro-benzimidazole | 362–364 |
| 17 | 2-(3',4'dimethyl-phenyl)-4,5,6,7-tetrachloro-benzimidazole | 290–293 |
| 18 | 2-(3',4'-dichlorophenyl)-4,5,6,7-tetrabromo-benzimidazole | 282–283 |
| 19 | 2-(3',5'-bis-trifluoromethyl-phenyl)-4,5,6,7-tetrabromo-benzimidazole | 285–286 |
| 20 | 2-(3',4',5'-trichlorophenyl)-4,5,6,7-tetrachloro-benzimidazole | 297–300 |
| 21 | 2-(3',4',5'-trimethoxy-phenyl)-4,5,6,7-tetrachloro-benzimidazole | 310–311 |
| 22 | 2-(4'-chlorophenyl)-4,5,6-trichloro-7-bromo-benzimidazole | 258–259 |
| 23 | 2-(3',4'-dichlorophenyl)-4,5,6-trichloro-7-bromo-benzimidazole | 274–276 |
| 24 | 2-(2'-hydroxy-3',5'-dichlorophenyl)-4,5,7-trichloro-benzimidazole | 262–264 |
| 25 | 2-(3',4'-dichlorophenyl)-6-bromo-4,5,7-trichloro-benzimidazole | 270–273 |
| 26 | 2-(3',4'-dichlorophenyl)-4,6,7-trichloro-benzimidazole | 292–293 |
| 27 | 2-(3'-trifluoromethyl-4'-chlorophenyl)-4,6,7-trichloro-benzimidazole | 262–264 |
| 28 | 2-(3',4'-dichlorophenyl)-4,6,7-trichloro-5-fluoro-benzimidazole | 268–270 |
| 29 | 2-(3',-4'-dichlorophenyl)-4,6,7-trichloro-5-acetyl-amino-benzimidazole | 230–250 |
| 30 | 2-(3',5'-bis-trifluoromethyl-phenyl)-4,6,7-tribromo-5-trifluoromethyl-benzimidazole | 243–246 |
| 31 | 2-(3',4'-dichlorophenyl)-4,6-dichloro-7-(p-chlorophenyl-sulphonyl)-benzimidazole | 302–304 |
| 32 | 2-(3',4'-dichlorophenyl)-4,6-dibromo-7-chloro-5-trifluoromethyl-benzimidazole | 214–215 |
| 33 | 2-(3',4'-dichlorophenyl)-4,7-dibromo-5,6-dichloro-benzimidazole | 268–270 |
| 34 | 2-(3',4'-dichlorophenyl)-5,6-dichloro-benzimidazole | 251–252 |
| 35 | 2-(3',4'-dichloro-2'-sulphonyl-phenyl)-5,6-dichloro-benzimidazole | >360 |
| 36 | 2-(3',5'-bis-trifluoromethyl-phenyl)-5-trifluoromethyl-4,6-dibromo-7-chloro-benzimidazole | 212–215 |
| 37 | 2-(3',4'-dichlorophenyl)-5-trifluoromethyl-benzimidazole | 223–225 |
| 38 | 2-(3',5'-bis-trifluoromethyl-phenyl)-5-trifluoromethyl-benzimidazole | 224–226 |

EXAMPLE 39

4.0 g. of 2-(3',4'-dichlorophenyl)-4,5,6,7-tetrachlorobenzimidazole, produced as described in Example 4, are suspended in about 100 ml. of ethanol, and 10 ml. of a normal aqueous potassium hydroxide solution are added thereto. The resulting clear solution is evaporated to dryness in vacuo, and the potassium salt of the aforesaid benzimidazole derivative is obtained as a white powder in almost quantitative yield.

In an analogous manner, but using normal aqueous sodium hydroxide solution in lieu of potassium hydroxide solution, the corresponding sodium salt is obtained.

EXAMPLE 40

20.0 g. of the starting benzimidazole used in Example 39 are suspended in about 250 ml. of ethanol and a suspension of about 1.0 g. of finely pulverized magnesium oxide in about 50 ml. of water is added thereto. The resulting solution is evaporated to dryness in vacuo, and then neutral magnesium salt of 2-(3',4'-dichlorophenyl)-4,5,6,7-tetrachlorobenzimidazole is obtained as a white powder in almost quantitative yield.

The new active substances of General Formula I can be applied by the usual processes for textile finishing. They have considerable affinity to keratin material and are thus excellently suitable for the protection thereof from insects which eat it, particularly for the washproof mothproofing of such materials in the raw as well as in the processed state, e.g. raw or processed sheep's wool as well as other animal hair, fells, feathers and furs. Compared with other active substances of the benzimidazole series, the new active substances of General Formula I are distinguished by their good stability to washing.

In addition to their insecticidal activity against the larvae of the clothes moth, the compounds of Formula I also have such an action against the larvae of the fur and carpet beetles so that textiles such as blankets, woollen carpets, woollen underwear, woollen outer clothes and knitted goods treated in any way desired with agents containing the new active substances are given lasting protection against all types of insects which injure keratin fibres by eating.

The testing of benzimidazoles of General Formula I according to the invention as to their insecticidal action against such insects which eat keratin fibers and the testing of keratin textile materials treated with these active substances as to their resistence to attack from such pests were performed in the following way:

Test methods and results.—A 0.5% stock solution of the active substance to be tested in 2-methoxyethanol is prepared. Then, at room temperature, an aqueous application liquor is produced which, in 400 ml., contains 20 ml. of the said stock solution (0.1 g. active substance). 10 g. of wool flannel are then well wetted with hot water and introduced at room temperature. While constantly circulating the wool sample, the bath temperature is raised to 60° within 15 minutes, then 2% of formic acid (80%), calculated on the weight of the wool, are added and the sample is treated for another 30 minutes at this temperature in this liquor. It is then cooled, the wool sample is rinsed in running tap water, centrifuged and hung up to dry. The concentration of active substance is 1% calculated on the weight of the wool.

The sample so dried is then subjected to a mothproofing test against clothes moths (*Tineola biselliella*) according to the prescription of the "schweiz. Normenverbandes SNV 95901" (Swiss Association for Standardisation, SNV 95901), and the fastness is tested against larvae of the fur beetle (*Attagenus piceus*) and the carpet beetle (*Anthrenus vorax*) according to SNV 95902; obviously, the method for Anthrenus larvae was applied to *Attagenus piceus* larvae by using 6–7 week old larvae of the latter type for the test. The method consists in cutting 4 pieces of equal size from the treated wool flannel sample and exposing each of these pieces for 14 days at a constant temperature (28° C.) and constant relative humidity (65%) to attack (by eating) of 15 larvae of the corresponding pest (in each case 2 pieces exposed to the same pest).

The results are given in the following table.

The evaluation is based on the loss in weight of the flannel sample and is shown in the table as follows:

xxxx.—very good action.
xxx.—good action.
xx.—moderate action.
x.—bad action.

TABLE II
[1% active substance calculated on the weight of the wool]

| Active substance | Moths | Attagenus | Athrenus |
|---|---|---|---|
| 2-(4'-chlorophenyl)-4,5,6,7-tetrachloro-benzimidazole | xxxx | xxx | xxxx |
| 2-(4'-trifluoromethyl-phenyl)-4,5,6,7-tetrachloro-benzimidazole | xxxx | xxxx | xxxx |
| 2-(3',4'-dichloro-phenyl)-4,5,6,7-tetrachloro-benzimidazole | xxxx | xxxx | xxxx |
| 2-(3',4'-dichlorophenyl)-4,5,6,7-tetrabromo-benzimidazole | xxxx | xxx | xxxx |
| 2-(3',5'-bis-trifluoromethyl-phenyl)-4,5,6,7-tetrachlorobenzimidazole | xxxx | xxxx | xxxx |
| 2-(3'-5'-bis-trifluoromethyl-phenyl)-4,5,6,7-tetrabromobenzimidazole | xxxx | xxxx | xxxx |
| 2-(3',4',5'-trichlorophenyl)-4,5,6,7-tetrachloro-benzimidazole | xxxx | xxxx | xxxx |
| 2-(4'-chlorophenyl)-4,5,6-trichloro-7-bromo-benzimidazole | xxxx | xxxx | xxxx |
| 2-(3',4'-dichlorophenyl)-4,5,6-trichloro-7-bromobenzimidazole | xxxx | xxx | xxx |
| 2-(3',4'-dichlorophenyl)-6-bromo-4,5,7-trichloro-benzimidazole | xxxx | xxxx | xxxx |
| 2-(3',4'-dichlorophenyl)-4,6,7-trichloro-benzimidazole | xxxx | xxxx | xxxx |
| 2-(3'-trifluoromethyl-4'-chlorophenyl)-4,6,7-trichloro-benzimidazole | xxxx | xxxx | xxxx |
| 2-(3',4'-dichlorophenyl)-4,6,7-trichloro-5-fluoro-benzimidazole | xxxx | xxxx | xxxx |
| 2-(3',4',5'-trichlorophenyl)-4,6-bis-trifluoromethyl-benzimidazole | xxxx | xxxx | xxxx |
| 2-(3',4'-dichlorophenyl)-5-trifluoromethyl-4,6-dibromo-7-chloro-benzimidazole | xxxx | xxxx | xxx |
| 2-(3',4'-dichlorophenyl)-4,7-dibromo-5,6-dichloro-benzimidazole | xxxx | xxxx | xxxx |
| 2-(3',4'-dichlorophenyl)-5-trifluoromethyl-benzimidazole | xxxx | xxxx | xxxx |

Insecticidal and acaricidal agents according to the invention which contain the new active substances and can be used in, e.g. plant protection, can be in solid or liquid form, e.g. dusts, sprinkling agents or aqueous dispersions which are obtained from wettable powders, pastes or emulsion concentrates and solutions and aerosols.

For the protection of keratin material from insects which eat it, the agents according to the invention should contain the new active substances in a finely distributed form. Thus, solutions, aqueous suspensions and emulsions are used in particular for this application.

The active substance of General Formula I in the form of their alkali metal salts they generally have good water solubility. They can be brought onto keratin material direct from these aqueous solutions by dipping such material for a shorter or longer time in solutions of the alkali metal salts, or spraying it with the solutions or treating it therein at a raised temperature.

The keratin-protecting agents according to the invention can contain other known active substances in addition to the new active substances of general Formula I. They can be combined, e.g. with halogenated anthranilic acid anilides, with halogenated and/or trifluoromethyl-substituted diphenyl ureas, with halogenated and sulphonated phenoxydiphenyl ureas and with 2-chloromethyl-sulphonylamino polychlorodiphenyl ethers.

The agents according to the invention are produced in the known way by intimately mixing the active substances with solid or liquid carriers and distributing agents. For the protection of keratin material, particularly organic solvents have proved valuable such as: propylene glycol, methoxyethanol, ethoxyethanol and dimethyl formamide. As distributing agents, emulsifying agents, e.g. sulphated castor oil, sulphite waste liquor and fatty alcohol sulphates can be used.

Keratinous materials can be impregnated with the active substances by the most varied textile finishing processes such as hot or cold, aqueous dye, chroming, pad dyeing or after-treatment baths. The new active substances are fixed onto the keratin fibre not only by hot application but also by cold application.

Because of the good solubility in organic solvents, the active substances are also well suitable for application from non-aqueous media. Here, the materials to be protected can simply be impregnated with the solutions. With a suitable choice of solvent, the materials can be given an insecticidal finish also in a dry cleaning process.

The production and composition of agents according to the invention and their application for the protection of keratin materials from pests which eat it, are further illustrated in the following examples. Parts and percentages are given therein by weight and the temperatures are in degrees centigrade.

EXAMPLE I 0.5 part of 2-(3',4'-dichlorophenyl)-4,5,6,7-tetrachloro-benzimidazole in the form of the sodium salt are dissolved with the aid of 10 parts of 0.1 N sodium hydroxide solution and a little ethanol. This solution is diluted with 3000 parts of water and 100 parts of wool are treated for 15 minutes in this liquor at 60°. 5 parts of 100% acetic acid are then added and the treatment is continued at 60° for another hour. The wool is then rinsed in the usual way and dried On testing, it proves to be resistant to attack by moth larvae, fur and carpet bettle larvae.

EXAMPLE II

First, a 20% solution of 2-(4'-chlorophenyl)-4,5,6-trichloro-7-bromo-benzimidazole in 2 - methoxyethanol is produced. 10 parts by volume of this solution are diluted with 200 parts by volume of a solvent suitable for dry cleaning, e.g. a suitable benzine fraction ("Diluan S"). If desired, cleansing additives can be added. In addition, the compounds can also be used in the form of the alkali metal salts or can be converted into such in the solution by the addition of a slight amount of alkali liquor. The wool articles are treated in the usual way in this cleaning liquor and then centrifuged to a solvent content of about 100% of the weight of the wool. After drying, they prove to be mothproofed.

The same bath or those of analogous composition can be used in an analogous way for the mothproofing of untreated keratin-containing articles or of those which have been treated in some way or cleaned.

Similar mixtures can also be used for the sprinkling or spraying of wool in any stage of processing.

We claim:
1. An insecticidal and acaricidal composition comprising (1) as active substance an insecticidally or acaricidally effective amount of a compound of the formula

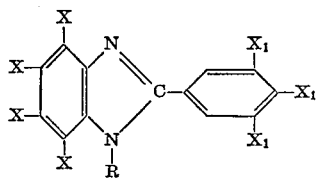

wherein R is hydrogen or an alkali or alkaline earth metal cation; each X is fluorine, chlorine, bromine or trifluoromethyl; and two of $X_1$ are chlorine, bromine or trifluoromethyl and the other $X_1$ is hydrogen, chlorine, bromine or trifluoromethyl; with the proviso that X and $X_1$ each may not represent more than two trifluoromethyl groups, and (2) an agriculturally acceptable carrier compatible with said compound.

2. A composition as described in claim 1, wherein said active substance is in finely distributed form and in admixture with a solid or liquid distributing agent.

3. A method for protecting keratinous material from damage by insects or their larvae, comprising applying to said keratinous material an insecticidally effective amount of a compound of the formula

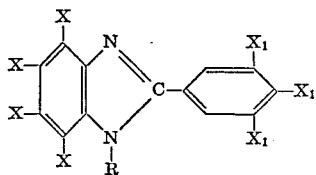

wherein R is hydrogen or an alkali or alkaline earth metal cation; each X is fluorine, chlorine, bromine or trifluoromethyl; and two of $X_1$ are chlorine, bromine or trifluoromethyl and the other $X_1$ is hydrogen, chlorine, bromine or trifluoromethyl; with the proviso that X and $X_1$ each may not represent more than two trifluoromethyl groups.

4. A method for controlling insects and Acarina comprising applying to a site subject to infestation by these pests, an insecticidally or acaricidally effective amount of a compound of the formula

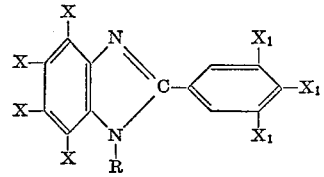

wherein R is hydrogen or an alkali or alkaline earth metal cation; each X is fluorine, chlorine, bromine or trifluoromethyl; and two of $X_1$ are chlorine, bromine or trifluoromethyl and the other $X_1$ is hydrogen, chlorine, bromine or trifluoromethyl; with the proviso that X and $X_1$ each may not represent more than two trifluoromethyl groups.

5. A method according to claim 4 in which the compound is 2 - (3',4' - dichlorophenyl)-4,5,6,7-tetrachloro-benzimidazole.

6. A method according to claim 4 in which the compound is 2-(3',5'-bis-trifluoromethyl-phenyl)-4,5,6,7-tetrachloro-benzimidazole.

7. A method according to claim 4 in which the compound is 2-(3',5'-bis-trifluoromethyl-phenyl)-4,5,6,7-tetrabromo-benzimidazole.

8. A method according to claim 4 in which the compound is 2-(3',4'-dichlorophenyl)-4,6-dibromo-5-trifluoromethyl-7-chloro-benzimidazole.

9. A method according to claim 4 in which the compound is 2-(3',5'-bis-trifluoromethyl-phenyl)-4,6-dibromo-5-trifluoromethyl-7-chloro-benzimidazole.

References Cited
UNITED STATES PATENTS

| 3,247,217 | 4/1966 | Grewe et al. | 424—273 |
| 3,325,356 | 6/1967 | Dinetta et al. | 424—273 |
| 3,325,508 | 6/1967 | Samuel | 424—273 |

ALBERT T. MEYERS, Primary Examiner

D. M. STEPHENS, Assistant Examiner